B. A. TUCKER
BURNER ATTACHMENT.
APPLICATION FILED NOV. 10, 1914.

1,164,768.

Patented Dec. 21, 1915.

Inventor
B. A. Tucker,

Witnesses
Frederick W. Ely
John J. McCarthy

By Victor J. Evans
Attorney

UNITED STATES PATENT OFFICE.

BENJAMIN AUGUSTUS TUCKER, OF NASHVILLE, TENNESSEE.

BURNER ATTACHMENT.

1,164,768.  Specification of Letters Patent.  Patented Dec. 21, 1915.

Application filed November 10, 1914. Serial No. 871,338.

*To all whom it may concern:*

Be it known that I, BENJAMIN A. TUCKER, a citizen of the United States, residing at Nashville, in the county of Davidson and State of Tennessee, have invented new and useful Improvements in Burner Attachments, of which the following is a specification.

This invention relates to improvements in burners for gasolene and oil stoves, and has particular application to a heat concentrating shell for the burner.

In carrying out the present invention it is my purpose to provide a heat concentrating shell for the burner of gas, gasolene and analogous stoves whereby the heat from the burner will be confined within the immediate vicinity of the burner and directed against the bottom of the article supported above the burner, thereby enabling the pan or other utensil above the burner to be heated rapidly and preventing waste of the heat units.

It is also my purpose to provide a device of the class described which will embrace the desired features of simplicity, efficiency and durability, which may be manufactured and marketed at a minimum expense and which may be applied to the burner rapidly and conveniently.

With the above and other objects in view, the invention consists in the construction, combination and arrangement of parts hereinafter set forth in and falling within the scope of the claim.

Figure 1:
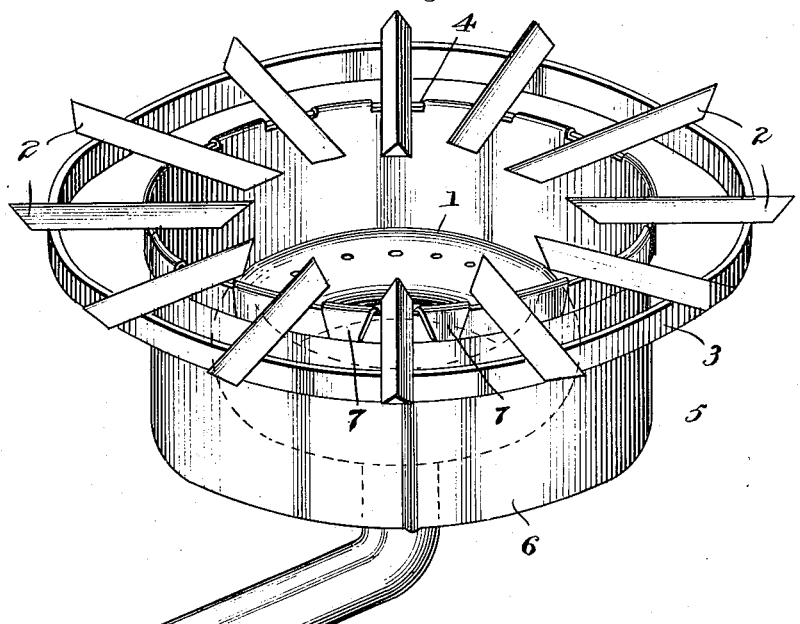
Figure 2:
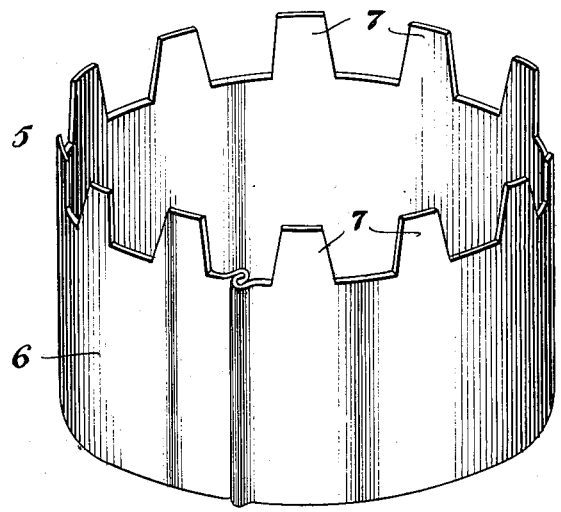

In the accompanying drawings: Figure 1 is a perspective view of a gas stove burner and the supporting fingers equipped with the heat concentrating shell constructed in accordance with the present invention; and Fig. 2 is a perspective view of the shell removed from the burner.

Referring now to the drawings in detail, 1 designates the burner of a gas or liquid fuel stove, while 2 indicates the supporting fingers mounted above the burner 1 and radiating from the center of the burner. In the present instance the fingers 2 are mounted upon an annulus 3 and suitably secured thereto adjacent to the outer ends of such fingers and upon an annulus 4 disposed within the annulus 3 and connected with the fingers adjacent to the inner extremities thereof.

5 designates my improved heat concentrating shell formed of an annular band 6 composed of metal or other suitable material and having the upper edge thereof formed with upwardly extending fingers 7. In the present instance, this band 6 is made from a metal strip having the ends thereof overlapped and soldered or otherwise secured to each other.

In practice, the shell 5 is placed about the burner 1, and the upper edge thereof is disposed within and in contact with the inner annulus 4. The fingers 7 are now bent backwardly over the adjacent annulus 4 so as to effect a connection between the band 6 and the annulus whereby the shell will be securely held in position. When the fuel issuing from the burner is ignited and a cooking utensil or other article placed upon the supporting fingers 2, the shell 5 acts to confine the heat from the burner within the space defined by the shell and direct such heat against the bottom of the cooking utensil, thereby insuring a rapid heating of the cooking utensil with a minimum amount of fuel.

From the foregoing description, taken in connection with the accompanying drawings, the construction and manner of employing my heat concentrating shell will be readily seen. It will be seen that I have provided a heat concentrating shell which can be readily applied to the burner and fixed in position and which may be manufactured and marketed at a comparatively small cost.

I claim:

The combination with a burner, fingers above said burner and radiating from the center of the burner, and an annulus disposed below the fingers and connected thereto, of a heat concentrating shell encircling the burner and having the upper edge disposed flush with the upper edge of said annulus, and fingers formed on the upper edge of said shell and spaced apart and adapted to be bent downwardly over said annulus between the first-mentioned fingers to hold said shell to said annulus.

In testimony whereof I affix my signature in presence of two witnesses.

BENJAMIN AUGUSTUS TUCKER.

Witnesses:
B. CARMICHAEL,
J. F. PHELAN.